W. G. DOUGLAS & W. ROBINSON.

GRAIN CAR DOOR.

APPLICATION FILED JAN. 7, 1910.

Reissued Aug. 2, 1910.

13,139.

2 SHEETS—SHEET 1.

WITNESSES

M. Gillinson

Russell Smith

INVENTORS

W. G. DOUGLAS

W. ROBINSON

BY Fred B. Fellows Atty.

ATTY.

W. G. DOUGLAS & W. ROBINSON.
GRAIN CAR DOOR.
APPLICATION FILED JAN. 7, 1910.
Reissued Aug. 2, 1910.
13,139.
2 SHEETS—SHEET 2.
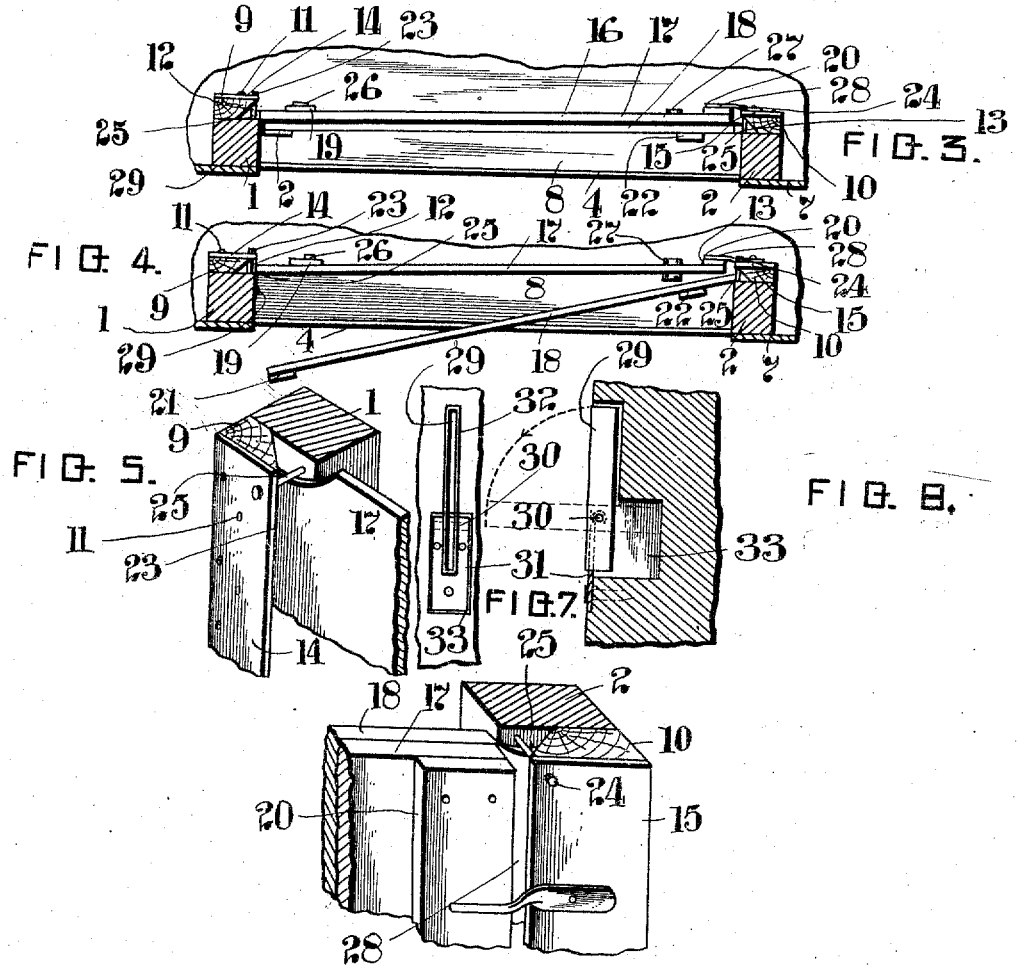
WITNESSES
M. Gillinson
Russell B. Smart
INVENTORS
W. G. DOUGLAS
W. ROBINSON
BY Frank B. Schwartz
ATTY.

UNITED STATES PATENT OFFICE.

WILLIAM GRIGG DOUGLAS, OF WINNIPEG, AND WILLIAM ROBINSON, OF SELKIRK, MANITOBA, CANADA.

GRAIN-CAR DOOR.

13,139. Specification of Reissued Letters Patent. Reissued Aug. 2, 1910.

Original No. 927,335, dated July 6, 1909, Serial No. 439,838. Application for reissue filed January 7, 1910. Serial No. 536,954.

*To all whom it may concern:*

Be it known that we, WILLIAM GRIGG DOUGLAS, of the city of Winnipeg, in the Province of Manitoba, and WILLIAM ROBINSON, of the town of Selkirk, in the Province of Manitoba, Canada, have invented certain new and useful Improvements in Grain-Car Doors, of which the following is the specification.

Our invention relates to grain car doors, and the object of the invention is to provide a strong, serviceable and inexpensive door, by which grain, coal, and such like produce can be quickly unloaded from the car and which will not allow of leakage of the grain when in position.

A further object is to provide a grain door in the construction of which the usual form of rectangular doors at present so widely employed can be utilized.

It consists essentially in a door formed from two similar members, of the same height, which when in position overlap the one on the other; means carried by the door post for receiving the ends of the door; means for retaining the members in closed position when the car is empty or loaded; and means for preventing upward displacement of the door, the parts being arranged and constructed as hereinafter more particularly described.

Figure 1:
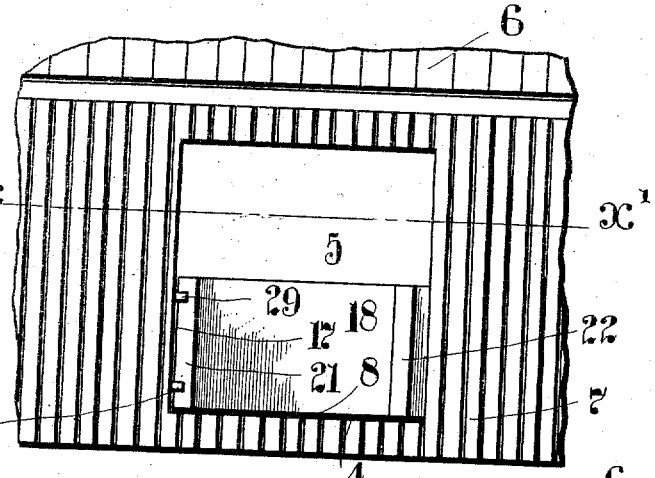
Figure 2:
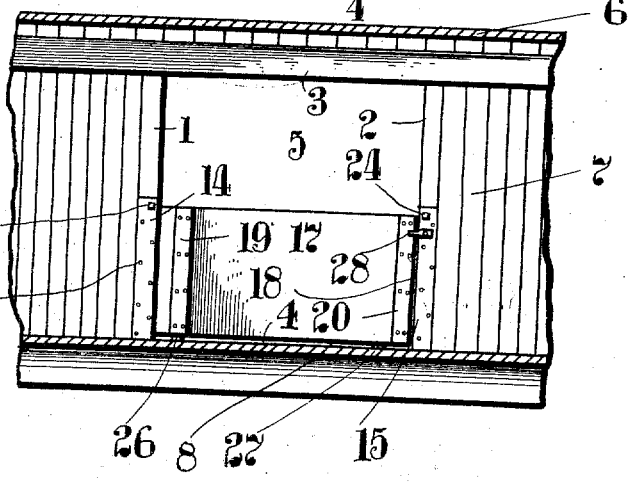

Figure 1 is a side elevation of a portion of a car showing the door way opening, supplied with our door. Fig. 2 is a side elevation of the door in position, and looking at it from the interior of the car. Fig. 3 is a sectional view through the walls of the car in the plane denoted by the line X X′, Fig. 1, and looking downwardly on the door, the door being closed. Fig. 4 is a similar view to that shown in Fig. 3, the door being shown in the position which it assumes immediately prior to releasing the grain. Fig. 5 is an enlarged detailed perspective view of a portion of one of the door posts showing a portion of one of the members of the door and the manner in which it is retained in position against the door post. Fig. 6 is an enlarged detailed perspective view of the other of the door posts showing a portion of both members of the door and the means employed for securing the inner member in closed position when the car is empty. Fig. 7 is a side elevation of a portion of one of the door posts showing the latch employed for retaining the door in closed position when the car is loaded. Fig. 8 is a vertical section taken through the center of Fig. 7.

In the drawings like characters of reference indicate corresponding parts in each figure.

1 and 2 are the ordinary door posts of a car of which 3 is the upper cross beam and 4 the door sill, such portions bounding the door-way opening 5.

6 is the roof of the car and 7 are the face boards to the side of the door posts.

8 is the door plate firmly secured to the door sill and passing between the door posts.

9 and 10 are a set of similar vertically extending wooden bars secured firmly to the door posts by means of bolts 11. Each of these latter bars have one of their corners cut away forming with the adjoining door post V or wedge-shaped channels 12 and 13.

14 and 15 are metallic plates securely fastened to the bars 9 and 10 by the bolts 11, already referred to. The purpose of these plates is to prevent any possibility of the doors being nailed to the door posts.

The door 16 is formed from inner and outer similar members 17 and 18, both of such members being of the usual height employed in grain doors, and of a length somewhat greater than the doorway opening.

19 and 20 are cross reinforcing strips secured to the inner member 17, and the strip 20 being at one extreme end of the member and on the inner side, and the strip 19 somewhat back from its other end.

21 and 22 are reinforcing cross strips secured to the outer face of the member 18 of the door, the strip 21 being fastened to the extreme end of the member and the strip 22 being secured near the opposite end somewhat back from such end. The cross strips 20 and 21 in this wise appear at the opposite ends of the door immediately to the sides of the door posts. One end of each member is adapted to pass within the V-shaped channels 12 and 13, the other or free ends overlapping and being just clear of the door posts.

23 and 24 are bolts passing through the plates 14 and 15 across the V-shaped channels and into the door posts. The bolts are located toward the upper end of the plates and serve the purpose of preventing the door from having any upward play when in position. This is accomplished by cutting away one of the upper corners of each member of the door, as at 25, so that the ends of the members pass under and engage when in position, with the bolts.

26 and 27 are plates fastened to the inner member of the door near the bottom, their purpose being to keep the lower edge of the inner member of the door at the same level as the outer member of the door which rests on the door plate.

28 is a button pivotally secured to the plate 15, such button being designed to retain the inner member of the door in the closed position when the car is empty. 29 are similar latches pivotally supported by pins 30 which are carried by plates 31 securely fastened within a recess formed on the inner face of the door post 1. The door post is also recessed at 32 and 33, the recess 32 forming a housing for the latch when in the upper position, and the recess 33 allowing the latch to pass downwardly (in the direction of the arrow Fig. 8) to the alternate position, as shown by dotted lines. It will be noticed that the pins 30 pass through the latches somewhat to the side of the center, and that the latches have their edges extending slightly beyond the plane of the door post. The purpose of this is to allow the latch to be readily thrown downwardly.

In order to better understand the operation of the door we will now describe the manner in which it is placed in position:—One end of the member 17 is placed within the channel 12, and the opposite end of the member 18 is passed within the channel 13, the members in this position overlapping for practically the full width of the doorway. The latches 29 are thrown to the position shown in dotted lines in Fig. 8, and in this position it is required that the cross brace 21 rest against the latches. If the car be filled with grain it is unnecessary to throw the button 28 to the position shown in Fig. 6, as the pressure of the grain prevents the inner member from swinging inwardly. When the car is unloaded or empty the button is required, as is obvious, to prevent the inner section from passing out of position. To open the door when the car is loaded it is only necessary to force the latches to their upper position. Immediately this is done the free end of the member 18 is pulled outwardly till it assumes the position shown in Fig. 4, when it can be readily removed by pulling its longitudinally or pressing downwardly on the door sill. As soon as it is released the inner member is forced outwardly with the grain.

One of the characteristics of the novel features of the present invention lies in the fact that the free end of the outer overlapping section is held in position by the retaining latches 29 and in this connection it will also be noted that the retaining latches are only to be considered as illustrative of any form of releasable retaining means carried by the fixed posts and engaging the free end of the outer section.

What we claim as our invention is:

1. A grain car door formed from inner and outer disconnected and overlapping sections, each section having one of its ends adapted to abut against the sides of the door posts both of such members being in length greater than the width of the doorway opening, in combination with a set or releasable latches housed within openings provided within the door post, adjacent to the free end of the outer member as and for the purpose specified.

2. A grain car door formed from inner and outer disconnected and overlapping sections, each section having one of its edges adapted to fit in V-shaped grooves formed at the side of the door posts, in combination with a set of releasable latches housed within the door post adjacent to the free end of the outer section, such latches being adapted to retain the member in closed position as and for the purpose specified.

3. A grain car door, formed from inner and outer disconnected and overlapping sections, each section having one of its edges adapted to abut against the sides of the car door posts, in combination with retaining means for holding the members in closed position, and including a plurality of latches pivotally interconnected with supporting plates, such latches and plates being fitted within recesses formed in the door post adjacent the free end of the outer member of the door as and for the purpose specified.

4. In a device of the class described the combination with the door posts having grooves formed to the inner side thereof, and the grain door formed from a plurality of disconnected and overlapping sections, each section having a portion of one of its upper corners cut away, of a bolt passing across each of the grooves against which the cut away portion of the respective members is adapted to engage, as and for the purpose specified.

5. In a device of the class described, the combination with the door posts having V-shaped grooves formed at the sides thereof, and a grain door formed from inner and outer overlapping and disconnected sections, each section having one of its ends adapted to abut against the sides of one of the door posts, of a button pivotally secured to one of the grooved members and adapted to pass outwardly over the inner face of the free end of the inner member of the door as and for the purpose specified.

6. The combination with a car having a door opening and fixed supports at the side thereof, of a grain car door formed with inner and outer overlapping sections, each of which has one end adapted to abut the fixed support and the other end free, and releasable retaining means on one of the fixed supports to engage the free end of the outer section.

7. The combination with a car having a door opening and fixed supports at the side thereof, of a grain car door formed with inner and outer overlapping sections, each of which has one end adapted to abut the fixed support and the other end free, releasable retaining means on one of the fixed supports adapted to engage the free end of the outer section and means on the other fixed support for engaging the free end of the inner section.

8. The combination with a car having a door opening and fixed supports at the side thereof, of a grain car door formed with inner and outer overlapping sections, each of which has one end adapted to abut the fixed support and the other end free, releasable retaining means on one of the fixed supports adapted to engage the free end of the outer section, and means for preventing vertical movement of the section.

9. The combination with a car having a door opening and fixed supports at the side thereof, of a grain car door formed with inner and outer overlapping sections, each of which has one end adapted to abut the fixed support and the other end free, and releasable retaining means on one of the fixed supports adapted to engage the free end of the outer section, the said retaining means being adapted in disengaged position to extend slightly beyond the surface of the fixed support.

10. The combination with a car having a door opening, and fixed supports at the sides thereof having vertically extending grooves formed therein, into which the ends of the door may take, of a grain car door formed with inner and outer overlapping sections each of which has one end adapted to take into the grooves in the fixed support, means for preventing outward tilting of the free end of the outer section and a retaining member passing transversely across a groove and over the top of one of the sections.

11. The combination with a car having a door opening and fixed supports on the sides thereof formed with grooves, of a grain car door formed with inner and outer overlapping sections, each of which has one end adapted to take into the grooves in the fixed support and means for preventing outward tilting of the free end of the outer section, the said sections being disconnected from each other and from the fixed supports, whereby when released, they may be removed outwardly and separated.

12. A grain car door formed from inner and outer disconnected and overlapping sections, each section having one of its ends adapted to abut against the sides of the door posts in combination with a set of releasable latches housed within openings provided within the door post, adjacent to the free end of the outer member as and for the purpose specified.

13. A grain car door formed from inner and outer disconnected and overlapping sections, each section having one of its edges adapted to fit in grooves formed at the side of the door post, in combination with a set of releasable latches housed within the door post adjacent to the free end of the outer section, such latches being adapted to retain the member in closed position as and for the purpose specified.

14. In a device of the class described, the combination with the door posts and a grain car door formed from inner and outer overlapping and disconnected sections, each section having one of its ends adapted to abut against the sides of one of the door posts, of a button pivotally secured to one of the grooved members and adapted to pass outwardly over the inner face of the free end of the inner member of the door as and for the purpose specified.

In witness whereof we have hereunto set our hands in the presence of two witnesses.

WILLIAM GRIGG DOUGLAS.
WILLIAM ROBINSON.

Witnesses:

CHAS. H. MCTADYEN,
R. J. TURNER.